United States Patent [19]

Jorgensen

[11] Patent Number: 6,020,557
[45] Date of Patent: Feb. 1, 2000

[54] CONDUIT CONNECTOR ASSEMBLY WITH ANGLED CONDUIT GRIPPING MEANS

[75] Inventor: Robert W. Jorgensen, Niles, Mich.

[73] Assignee: Hubbell Incorporated, Orange, Conn.

[21] Appl. No.: 09/019,115

[22] Filed: Feb. 5, 1998

[51] Int. Cl.[7] ................................................. H02G 3/18
[52] U.S. Cl. ........................................ 174/65 R; 285/162
[58] Field of Search ............................... 174/65 R, 65 G, 174/151, 152 G, 153 G, 153 R, 152 R; 16/2.1, 2.2; 248/256; 285/194, 162

[56] References Cited

U.S. PATENT DOCUMENTS

| | | | |
|---|---|---|---|
| Re. 15,891 | 8/1924 | Thomas, Jr. ................................. | 16/2 X |
| 1,204,625 | 11/1916 | Wheelock ......................... | 174/152 G X |
| 2,255,971 | 9/1941 | Hall ................................................ | 16/2 |
| 2,465,844 | 3/1949 | Brushaber ............................ | 285/194 X |
| 2,736,450 | 2/1956 | Atkinson ................................ | 220/3.6 X |
| 2,744,769 | 5/1956 | Roeder et al. .......................... | 248/56 X |
| 3,858,151 | 12/1974 | Paskert .................................... | 285/162 X |
| 4,012,578 | 3/1977 | Mokan et al. .............................. | 174/51 |
| 4,021,604 | 5/1977 | Dola et al. .................................. | 174/51 |
| 4,711,472 | 12/1987 | Schnell ............................. | 174/153 G X |
| 4,880,387 | 11/1989 | Stikeleather et al. ...................... | 439/98 |
| 4,990,721 | 2/1991 | Sheehan ...................................... | 174/65 |
| 5,171,164 | 12/1992 | O'Neil et al. ............................ | 439/552 |
| 5,204,499 | 4/1993 | Faualora ................................. | 174/65 R |
| 5,276,280 | 1/1994 | Ball ......................................... | 174/65 R |
| 5,285,013 | 2/1994 | Schnell et al. .......................... | 174/65 R |
| 5,373,106 | 12/1994 | O'Neil et al. ........................... | 174/65 R |
| 5,422,437 | 6/1995 | Schnell .................................. | 174/65 R |
| 5,731,543 | 3/1998 | Jorgensen ............................... | 174/65 R |

*Primary Examiner*—Dean A. Reichard
*Attorney, Agent, or Firm*—Jerry M. Presson; Michael R. Swartz

[57] ABSTRACT

A conduit connector assembly which receives an end of a conduit carrying electrical wires includes a fitting body, an end stop grommet and a spring clip. The fitting body and spring clip are provided with inwardly projecting conduit gripping portions having grip ends which are angled relative to a reference plane disposed perpendicular to a longitudinal axis of the fitting body so as to make line contact rather than only a point contact with portions of convolutions of the conduit so that greater and more uniformly applied gripping force is produced that will prevent the conduit from being pulled out from the connector assembly.

15 Claims, 2 Drawing Sheets

CONDUIT CONNECTOR ASSEMBLY WITH ANGLED CONDUIT GRIPPING MEANS

CROSS REFERENCE TO RELATED APPLICATION

Reference is hereby made to the following copending U.S. application dealing with subject matter related to the present invention: "Conduit Connector Assembly With End Stop Grommet For Attachment Of Conduit To Junction Box" by Robert W. Jorgensen, assigned U.S. Ser. No. 08/654,067 and filed May 28, 1996, now U.S. Pat. No. 5,731,543, which is assigned to the same assignee as this application now U.S. Pat. No. 5,731,543.

BACKGROUND OF THE INVENTION

1. Field of the Invention

The present invention generally relates to conduit connector devices and, more particularly, is concerned with a conduit connector assembly including an angled conduit gripping means for connecting a conduit carrying electrical wires to an electrical junction box.

2. Description of the Prior Art

Electrical wiring is used for the connection of main electrical power lines and electrical outlets in order to provide access to electrical power in residential and commercial buildings and the like. Electrical junction boxes are provided in the buildings to receive portions of the electrical wiring and contain and isolate therein splices in the wiring which extends from the junction boxes to the main electrical power lines and to outlets and switches in the building. For protection of the electrical wiring, the wiring is generally housed and carried within metal conduits or metal cables (hereafter referred to as conduit). It is also desirable to connect ends of the metal conduits to the electrical junction boxes.

A variety of devices have been used over the years for connecting conduits which carry electrical wires to electrical junction boxes. Representative examples of these devices are disclosed in U.S. Pat. No. 3,369,071 to Tuisku, U.S. Pat. No. 4,012,578 to Moran et al., U.S. Pat. No. 4,021,604 to Dola et al., U.S. Pat. No. 4,880,387 to Stikeleather et al., U.S. Pat. No. 4,990,721 to Sheehan, U.S. Pat. No. 5,171,164 to O'Neil et al., U.S. Pat. No. 5,204,499 to Favalora, U.S. Pat. No. 5,276,280 to Ball, U.S. Pat. No. 5,285,013 to Schnell et al., U.S. Pat. No. 5,373,106 to O'Neil et al. and U.S. Pat. No. 5,422,437 to Schnell.

One such device produced and sold by Hubbell, Incorporated, of Orange, Conn., includes a fitting body having an interior bore with four integral end tabs folded ninety degrees to serve as an end stop at a first opposite end of the fitting body for insertion into an electrical junction box and a spring clip for attachment at the bottom of a second opposite end of the fitting body for gripping a conduit carrying electrical wires inserted within the fitting body. While this prior art Hubbell conduit connector device has performed with satisfaction over the years and has met objectives it was originally designed to achieve, the device does not meet current performance standards. As in the case of any product, over time improvements are required.

Consequently, a need exists for improvement of the prior art Hubbell conduit connector device which meets current performance standards and yet is economical to manufacture.

SUMMARY OF THE INVENTION

The present invention provides a conduit connector assembly for connecting a conduit carrying electrical wires to an electrical junction box which is generally used to receive electrical wiring whenever an outlet, switch, or access to splices is desired in a building. The conduit connector assembly of the application cross-referenced above and the conduit connector assembly of the present invention are both designed to satisfy the aforementioned need by providing a fitting body, an end stop grommet, a spring clip and conduit gripping means on the fitting body and spring clip. However, a shortcoming in the connector assembly of the cross-referenced application is that due to its configuration, the conduit gripping means only makes point contact with the conduit and, as a result, produces a gripping force that under certain conditions is insufficient to prevent the conduit from being pulled out of the connector assembly. The fitting body and spring clip of the connector assembly of the present invention are provided with conduit gripping means which are angled so as to make line contact rather than only point contact with the conduit so that a greater and more uniformly applied gripping force is produced that will substantially prevent the conduit from being pulled out from the connector assembly.

Accordingly, the present invention is directed to a conduit connector assembly for attachment of a conduit carrying electrical wires to an electrical junction box and having convolutions on an exterior surface extending at a predetermined pitch angle relative to a reference plane disposed perpendicular to a longitudinal axis of the conduit. The connector assembly comprises: (a) a fitting body having a longitudinal axis, a pair of open first and second opposite ends and an interior bore extending between the first and second opposite ends for receiving therein from the first opposite end an end portion of a conduit carrying electrical wiring which emanates from the end portion of the conduit, the fitting body at the second opposite end being insertable through an opening in an electrical junction box; (b) end stop means on the fitting body for allowing passage of the electrical wiring into the electrical junction box and preventing passage of the end portion of the conduit into the electrical junction box; (c) means on the fitting body for gripping the end portion of the conduit so as to hold the conduit end portion within the interior bore of the fitting body, the gripping means being disposed at a predetermined angle relative to a reference plane disposed perpendicular to the longitudinal axis of the fitting body, the predetermined angle being substantially equal to the predetermined pitch angle of the conduit convolutions whereby line contact is provided between the gripping means and portions of the conduit convolutions contacted by the gripping means; and (d) means on the fitting body for connecting the fitting body to the electrical junction box.

The conduit gripping means includes either one or both of a grip tab on the fitting body and a gripping end portion on the spring clip. The grip tab extends inwardly from the fitting body and projects into the interior bore of the fitting body toward the second opposite end of the fitting body. The grip tab has a grip end which is disposed at the predetermined angle and makes the line contact with the contacted portion of the conduit convolutions. The spring clip is inserted at the first opposite end of the fitting body and has a gripping end portion disposed at a first end thereof within the interior bore of the fitting body. The gripping end portion has a grip end which is also disposed at the predetermined angle and makes the line contact with the contacted portion of the conduit convolutions. The predetermined gripping angle is between about five and fifteen degrees, and preferably ten degrees for matching the predetermined pitch angle.

More particularly, the grip tab on the fitting body is substantially rectangular in shape and has a pair of opposite sides being disposed between five and fifteen degrees, and preferably ten degrees, relative to the longitudinal axis of the fitting body. The grip end of the grip tab on the fitting body is disposed substantially perpendicular to the opposite sides thereof so as to be provided at the predetermined angle where it makes the line contact with the contacted portion of the conduit convolutions. The gripping end portion on the spring clip also is substantially rectangular in shape and likewise has a pair of opposite sides being disposed between five and fifteen degrees, and preferably ten degrees, relative to the longitudinal axis of the fitting body. The grip end of the gripping end portion on the spring clip is disposed substantially perpendicular to the opposite sides thereof so as to be provided at the predetermined angle where it makes the line contact with the contacted portion of the conduit convolutions.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
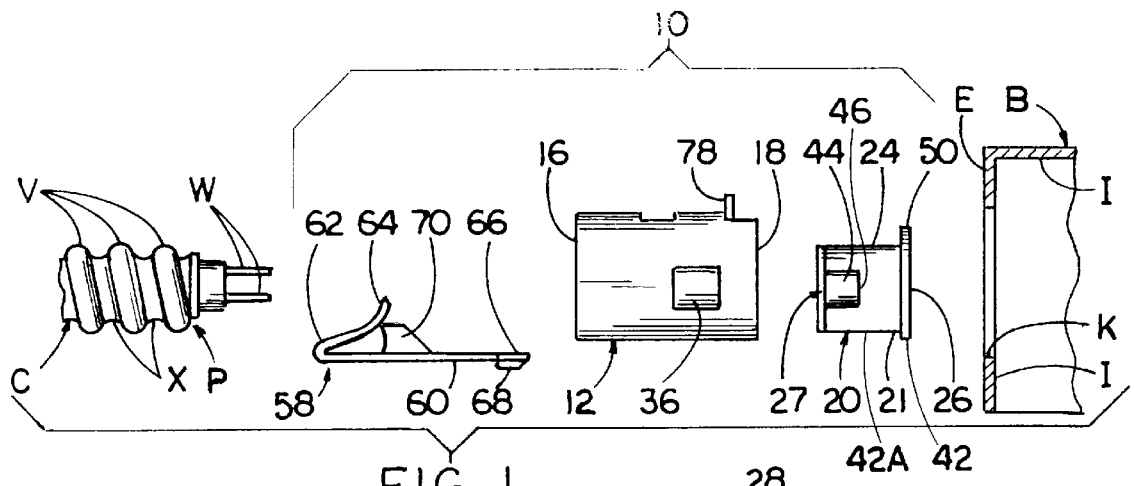
FIG. 1 is an exploded side elevational view of the components of a conduit connector assembly of the present invention for attachment of a conduit carrying electrical wires to an electrical junction box.
Figure 2:
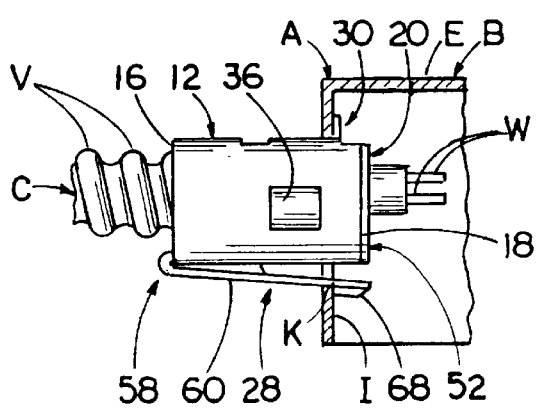
FIG. 2 is a side elevational view of the conduit connector assembly in assembled form attaching the conduit to the electrical junction box.
Figure 3:
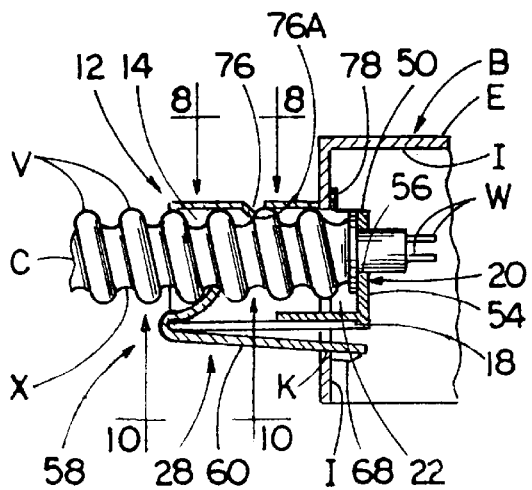
FIG. 3 is a longitudinal sectional view of the conduit connector assembly shown in FIG. 2.

Referring to the drawings and particularly to FIGS. 1 to 3, there is illustrated a conduit connector assembly, generally designated 10, of the present invention. The conduit connector assembly 10 is used for connecting a conduit C, normally comprised of a metal material and carrying electrical wires W, to a knockout opening K in an electrical junction box B which is used to receive electrical wiring W and contain splices made in end portions of the wiring W. The assembly 10 is designed to hold over 200 pounds without crushing the conduit C which is hollow and typically comprised substantially of thin aluminum or steel metal material.

Basically, the conduit connector assembly 10 includes a fitting body 12 defining an interior bore 14 and having a pair of open first and second opposite ends 16, 18, an end stop grommet 20 interfitted with the fitting body 12 and having a grommet body 21 defining an interior cavity 22 extending between a pair of open first and second end portions 24, 26 of the grommet body 21 with the grommet body 21 being inserted at the first end portion 24 thereof into the interior bore 14 of the fitting body 12 from the second opposite end 18 of the fitting body 12 to a predetermined position therein, and securing means 27 for securing the end stop grommet 20 to the fitting body 12 in their interfitted relationship. The assembly 10 also includes gripping means 28 for securing an end portion P of the conduit C within the interior bore 14 of the fitting body 12 and within the interior cavity 22 of the grommet body 20, and connecting means 30 for securing the fitting body 12 to the junction box B.

Referring now to FIGS. 1 to 5, the fitting body 12 of the assembly 10 more particularly is preferably made from a blank of suitable metal material, such as steel, and manufactured by any suitable conventional technique, such as by being rolled over a form, to provide the fitting body 12 with a substantially cylindrical shape longitudinally truncated by a flat side portion 32. The fitting body 12 has a longitudinal axis 33 with a longitudinal slit 34 extending the full length through the longitudinal center of the flat side portion 32 thereof. During assembling of the end stop grommet 20 to the fitting body 12, the longitudinal slit 34 allows the fitting body 12 to be transversely expanded and open wide enough across the slit 34 for insertion of the first end portion 24 of the grommet body 21 into the interior bore 14 of the fitting body 12 and then to contract and close over and thereby capture the first end portion 24 of the stop body 21 within the interior bore 14 of the fitting body 12. The fitting body 12 further has a pair of outwardly extending securing tabs 36 formed out of wall portions 12A of the fitting body 12 on opposite sides thereof. Formation of each securing tab 36 leaves a substantially rectangular opening 38 in each of the side wall portions 12A of the fitting body 12. As will become clear below, the openings 38 are part of the securing means 27 of the assembly 10 which are provided for securing the end stop grommet 20 to the fitting body 12. Each opening 38 has an edge portion 40 extending therealong and facing in a first direction toward the first opposite end 16 of the fitting body 12.

The end stop grommet 20 of the assembly 10 is preferably fabricated of a plastic material formed by any suitable conventional technique, such as injection molding, into a substantially annular shape longitudinally truncated by a flat side portion 42. The end stop grommet 20 has a general configuration which is substantially similar to that of the fitting body 12 in transverse cross-section but with the first end portion 24 of the grommet body 21 having a diameter size slightly less than that of the fitting body 12 for allowing the first end portion 24 of the grommet body 21 to fit within the interior bore 14 of the fitting body 12. The other part of the securing means 27 is a pair of locking tabs 44 rigidly attached to and disposed on opposite sides of the first end portion 24 of the grommet body 21 and projecting outwardly therefrom. Each locking tab 44 has an edge 46 facing in a second direction toward the second opposite end 18 of the fitting body 12 opposite from the first direction faced by the edge portion 40 of one of the openings 38 in the fitting body 12. The locking tabs 44 are brought into locking engagement with the edge portions 40 of openings 38 in the fitting body 12 upon insertion of the first end portion 24 of the grommet body 21 into the interior bore 14 of the fitting body 12 from the second opposite end 18 thereof to the predetermined position within the interior bore 14, as seen in FIGS. 2 and 3. The engagement of the grommet body locking tab edges 46 with the fitting body opening edge portions 40 enables the fitting body 12 and the end stop grommet 20 to be interfitted to one another in a snap-fit relationship. Also, the flat side portion 42 of the end stop grommet 20 has a substantially rectangular longitudinal relief portion 42A which is disposed in the same plane as the flat side 32 of the fitting body 12 upon insertion of the end stop grommet 20 into the interior bore 14 of the fitting body 12.

The second end portion 26 of the grommet body 21 of the end stop grommet 20 has outer means defining a first stop element for preventing the grommet body 21 from inserting into the interior bore 14 of the fitting body 12 beyond the predetermined position therein. Preferably, the outer means defining the first stop element takes the form of an outer flange 50 at the second end portion 26 of the grommet body 21 which extends radially outwardly beyond the grommet body 21 and makes flush contact with the fitting body 12 at the second opposite end 18 thereof which is fitted over the grommet body 21. Thus, it can be appreciated, that the outer flange 50 prevents the grommet body 21 from being inserted too far into the interior bore 14 of the fitting body 12, whereas, the flat side portion 42 of the end stop grommet 20 in conjunction with the locking tabs 44 of the grommet body 21 that lock into the openings 38 of the fitting body 12 prevent the end stop grommet 20 from twisting within and withdrawing from the interior bore 14 of the fitting body 12.

Further, the second end portion 26 of the grommet body 21 of the end stop grommet 20 also has inner means 52 defining a second stop element for blocking the end portion P of the conduit C from extending or projecting through the second end portion 26 of the grommet body 21. Preferably, the inner means 52 defining the second stop element takes the form of an end wall 54 disposed inwardly from the outer flange 50 at the second end portion 26 of the grommet body 21 for retaining the end portion P of the conduit C within the interior cavity 22 and thereby preventing the end portion P of the conduit C from extending further into the electrical junction box B. The end wall 54 of the grommet body 21 also defines an aperture 56 through the second end portion 26 of the grommet body 21 in the form of a round passage 56 therethrough for permitting the electrical wiring W emanating from the end portion P of the conduit C to pass into the electrical junction box B. The first end portion 24 of the grommet body 21 defining the interior cavity 22 has a first diameter size adapted to receive the end portion P of the conduit C, whereas, the aperture or round passage 56 has a second diameter size, less than the first diameter size and less than the diameter size of the interior cavity 22 of the grommet body 21, for allowing the passing of the electrical wiring W through the second end portion 26 of the grommet body 21. Furthermore, the round passage 56 is both off-centered (relative to the end wall 54 and also to the knockout opening K of box B) and smooth for permitting the electrical wiring W from the conduit C to align with and pass through without snagging or hanging up on the electrical junction box B.

Referring now to FIGS. 1 to 7, the gripping means 28 of the assembly 10 includes a spring clip 58. The spring clip 58 is per se identical to that used in the prior art Hubbell conduit connector device. The spring clip 58 is preferably made from a suitable flat sheet of metal material, such as steel, and manufactured, using a suitable conventional forming technique, so as to include a generally flat main body portion 60 having a first generally J-shaped curved end 62 terminating in a gripping end portion 64 which is curved away from the flat main body portion 60, and a second end 66 having a pair of opposite corner ears 68 formed to extend outwardly at acute angles to the main flat body portion 60 in an opposite direction therefrom compared to the direction in which the first curved end 62 extends therefrom. The spring clip 58 also includes a pair of middle side fins 70 attached along opposite sides of the flat main body portion 60 intermediately between the opposite ends 62, 66 and extending outwardly toward the gripping end portion 64 of the first curved end 62. The spring clip 58 is attachable to the fitting body 12 along the flat side portion 32 thereof by being inserted from the first opposite end 16 over the flat side portion 32 of the fitting body 12. The spring clip 58 also has a hole 72 formed through its flat main body portion 60 at a location between the middle side fins 70 and the second end 66 thereof.

In order to provide for installment and securement of the spring clip 58 to the fitting body 12, the fitting body 12 has a pair of opposite recesses 74 on opposite sides of the longitudinal slit 34 along the flat side portion 32 thereof. The recesses 74 and slit 34 together have a width extending transversely across the flat side portion 32 of the fitting body 12 which is greater than a width across the flat main body portion 60 of the spring clip 58 so that the recesses 74 can receive therethrough the middle side fins 70 on the spring clip 58 upon the insertion of the flat side portion 32 at the first end 16 of the fitting body 12 between the middle side fins 70 and the gripping end portion 64 of the first curved end 62 of the spring clip 58. This means of securement of the spring clip 58 to the fitting body 12 permits the spring clip 58 to pivot at the first curved end 62 thereof toward and away from the flat side portion 32 of the fitting body 12.

The gripping means 28 of the assembly 10 also includes a grip tab 76 disposed on the fitting body 12 opposite from the flat side portion 32 thereof and projecting inwardly into the interior bore 14 of the fitting body 12. The gripping end portion 64 of the spring clip 58 and the grip tab 76 of the fitting body 12 extend into recesses X between opposite sides of convolutions V formed in the external surface of the conduit C and thereby cooperate together to grip and secure the conduit C within the interior bore 14 of the fitting body 12. In most instances, the convolutions V extend at a predetermined slight, or small acute, pitch angle J, such as between five and fifteen degrees, and usually about ten degrees, relative to a reference plane R disposed perpendicular to a longitudinal axis 82 of the conduit C as shown in FIGS. 8–11.

The connecting means 30 of the assembly 10 for connecting the fitting body 12 to the electrical junction box B includes the pair of securing tabs 36 of the fitting body 12 making contact with an exterior side E of a wall A of the electrical junction box B adjacent to the knockout opening K thereof where the fitting body 12 is received therethrough, a connecting tab 78 attached to and disposed on the fitting body 12 opposite from the flat side portion 32 thereof and projecting outwardly therefrom and in substantially perpendicular relation to the fitting body 12 adjacent to the second end 18 thereof and making flush contact with an interior side I of the wall of the electrical junction box B adjacent to the knockout opening K thereof, and the pair of corner ears 68 at the second end 66 of the spring clip 58 making contact with the interior side I of the wall A of the electrical junction box B adjacent to the knockout opening K thereof. The connecting tab 78 of the fitting body 12, the corner ears 68 of the spring clip 58, and the pair of securing tabs 36 of the fitting body 12 cooperate together to releasably connect the assembly 10 to the electrical junction box B upon insertion of the second opposite end 18 of the fitting body 12 through the knockout opening K and into the electrical junction box B.

Figure 8:
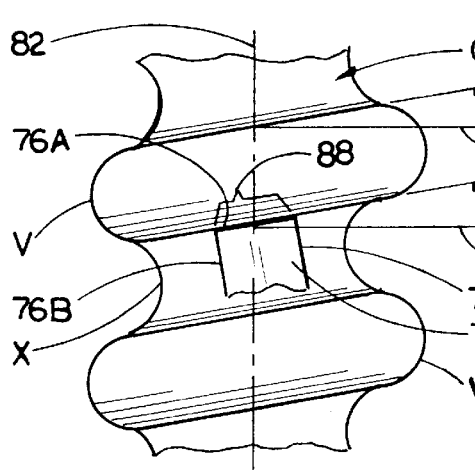
FIG. 8 is an enlarged top plan view depicting line contact made between the grip tab of the conduit connector assembly of the present invention and the portion of the convolutions of the conduit.
Figure 9:
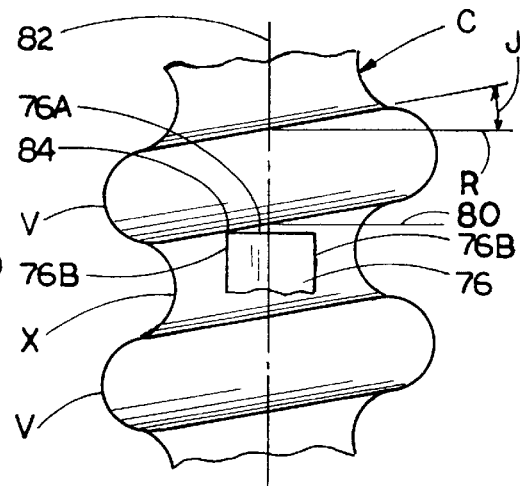
FIG. 9 is an enlarged top plan view depicting point contact made between the grip tab of the conduit connector assembly of the cross-referenced application and the portion of the convolutions of the conduit.
Figure 10:
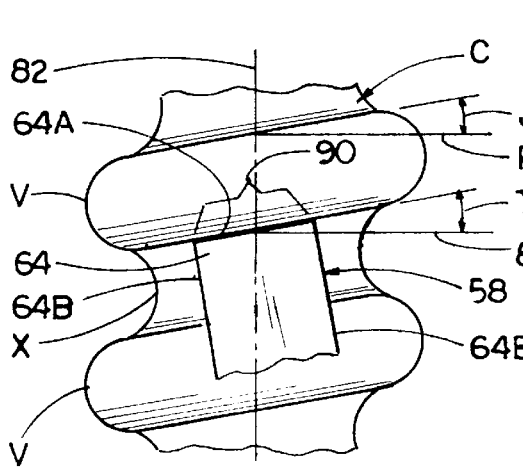
FIG. 10 is an enlarged bottom plan view depicting line contact made between the gripping end portion of the spring clip of the conduit connector assembly of the present invention and the portion of the convolutions of the conduit.
Figure 11:
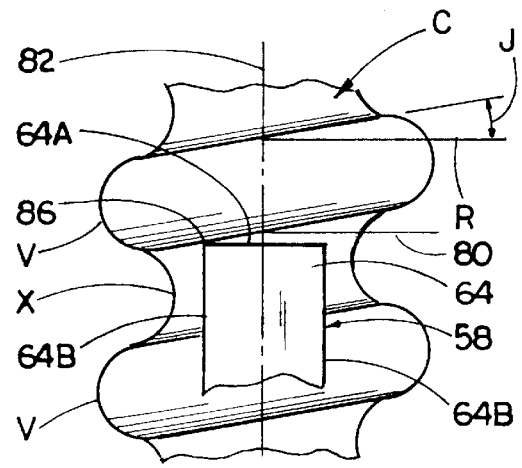
FIG. 11 is an enlarged bottom plan view depicting point contact made between the gripping end portion of the spring clip of the conduit connector assembly of the cross-referenced application and the portion of the convolutions of the conduit.

Referring now to FIGS. 9 and 11, a grip end 64A of the gripping end portion 64 of the spring clip 58 and a grip end 76A of the grip tab 76 of the fitting body 12 are illustrated disposed substantially parallel to a reference plane 80 extending substantially perpendicular to a longitudinal axis 82 of the conduit C. The reference plane 80 is substantially parallel to the reference plane R as shown in FIGS. 8–10 and the longitudinal axis 33 of the fitting body 12 is substantially parallel to the longitudinal axis 82 of the conduit C, when assembled, as shown in FIGS. 2 and 3. The grip ends 64A, 76A of the spring clip 58 and grip tab 76 of the connector assembly of the cross-referenced application have such configurations as are illustrated in FIGS. 9 and 11. With these configurations and in view that usually the convolutions V of the conduit C extend at the predetermined slight pitch angle J, such as between five and fifteen degrees, relative to the reference plane R disposed perpendicular to a longitudinal axis 82 of the conduit C, the grip ends 76A, 64A of FIGS. 9 and 11 only make point contact, as shown respectively at 84, 86, with the contacted portions of the conduit convolutions V and, as a result, produce a gripping force that under certain conditions is insufficient to prevent the conduit C from being pulled out of the connector assembly 10.

Referring to FIGS. 8 and 10, the grip end 76A of the grip tab 76 of the fitting body 12 and the grip end 64A of the gripping end portion 64 of the spring clip 58 of the connector assembly 10 of the present invention are angled so as to make line contact, as shown respectively at 88, 90, rather than only point contact 84, 86 with the contacted portions of the conduit convolutions V so that a greater and more uniformly applied gripping force is produced that will substantially prevent the conduit C from being pulled out from the connector assembly 10. The grip ends 64A, 76A alone may be angled such as by being cutoff at a small acute predetermined angle T, such as between about five to fifteen degrees and preferably about ten degrees, relative to the reference plane 80 in order to provide the line contact 88, 90 with the contacted portions of the conduit convolutions V. The predetermined angles T of the grip ends 64A, 76A are preferably substantially equal to the predetermined pitch angle J of the conduit convolutions V to provide the line contact 88, 90.

Figure 4:
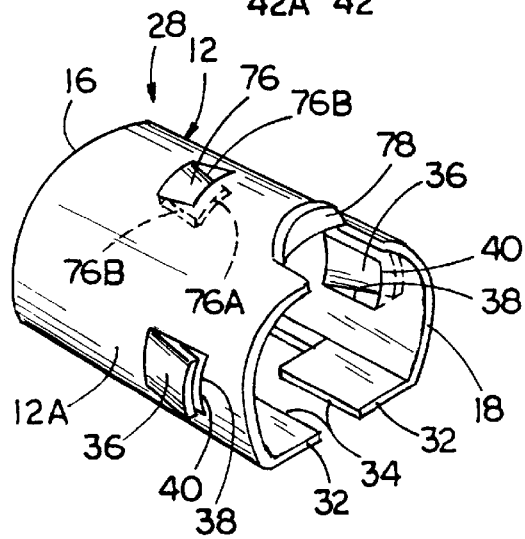
FIG. 4 is a perspective view of a fitting body of the conduit connector assembly.
Figure 5:
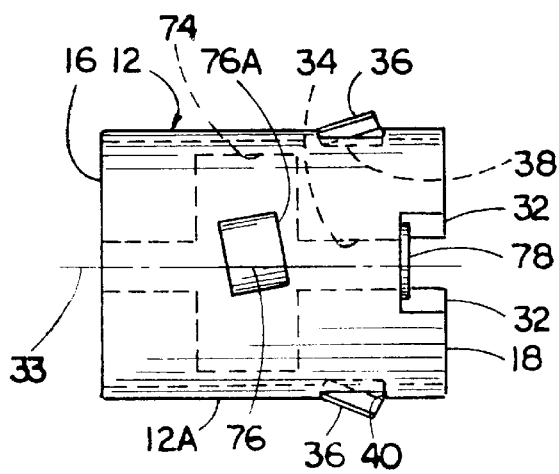
FIG. 5 is a top plan view of the fitting body shown in FIG. 4 showing a grip tab disposed at a predetermined angle relative to a longitudinal axis of the fitting body for making line contact with a portion of convolutions on an exterior surface of the conduit.
Figure 6:
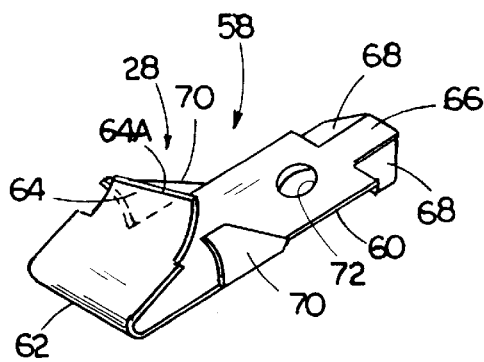
FIG. 6 is a perspective view of a spring clip of the conduit connector assembly.
Figure 7:
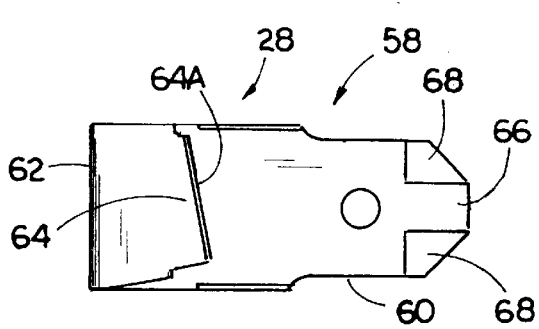
FIG. 7 is a top plan view of the spring clip shown in FIG. 6 showing a gripping end portion disposed at a predetermined angle relative to a longitudinal axis of the fitting body for making line contact with a portion of the convolutions of the conduit.

However, in the illustrated embodiment of FIGS. 8 and 10, the grip tab 76 and the gripping end portion 64 of the spring clip 58 and the grip tab 76 of the fitting body 12 are angled to provide the respective grip ends 64A, 76A at the desired predetermined angles T. As best seen in FIGS. 4, 5 and 8, the grip tab 76 is substantially rectangular in shape and has a pair of opposite sides 76B which are fabricated to be disposed at the predetermined angle T, such as between five and fifteen degrees, and preferably at ten degrees, relative to the longitudinal axis 82 of the conduit C. The grip end 76A is provided substantially perpendicular to the opposite sides 76B so as to thereby extend at the predetermined angle T, such as between five and fifteen degrees, and preferably at ten degrees, relative to the reference plane 80 which thereby provides the grip end 76A making the line contact 90 against the contacted portion of the convolution V on the exterior surface of the conduit C. As seen in FIG. 10, the gripping end portion 64 of the spring clip 58 also is substantially rectangular in shape and likewise has a pair of opposite sides 64B which are fabricated to be disposed at the predetermined angle T, such as between five and fifteen degrees, and preferably ten degrees, relative to the longitudinal axis 82 of the conduit C. The grip end 64A is provided substantially perpendicular to the opposite sides 64B so as to thereby extend at the predetermined angle T, such as between five and fifteen degrees, and preferably at ten degrees, relative to the reference plane 80 which thereby provides the grip end 64A making the line contact 88 against the contacted portion of the convolution V on the exterior surface of the conduit C. The angled orientation of the grip tab 76 and gripping end portion 64, as shown in FIGS. 8 and 10, respectively provide greater, more uniformly applied, gripping force to prevent the conduit C from being pulled out from the assembly 10 than does the orientation of the axially aligned grip tab 76 and gripping end portion 64, as shown in FIGS. 9 and 11, respectively.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. A conduit connector assembly for attachment of a conduit carrying electrical wires to an electrical junction box and having convolutions on an exterior surface extending at a predetermined pitch angle relative to a reference plane disposed perpendicular to a longitudinal axis of the conduit, said conduit connector assembly comprising:

(a) a fitting body having a longitudinal axis, a pair of open first and second opposite ends and an interior bore extending between said first and second opposite ends for receiving therein from said first opposite end an end portion of a conduit carrying electrical wiring which emanates from the end portion of the conduit, said fitting body at said second opposite end being insertable through an opening in an electrical junction box;

(b) end stop means on said fitting body for allowing passage of the electrical wiring into the electrical junction box and preventing passage of the end portion of the conduit into the electrical junction box;

(c) means on said fitting body for gripping the end portion of the conduit so as to hold the conduit end portion within said interior bore of said fitting body, said gripping means being disposed at a first predetermined angle relative to a reference plane disposed perpendicular to said longitudinal axis of said fitting body, said first predetermined angle of said gripping means being substantially equal to the predetermined pitch angle of the conduit convolutions whereby line contact is provided between said gripping means and portions of the conduit convolutions contacted by said gripping means, said gripping means including a spring clip inserted at said first opposite end of said fitting body and having a gripping end portion disposed at a first end thereof within said interior bore of said fitting body, said gripping end portion of said spring clip having a grip end disposed at said first predetermined angle of said gripping means and making the line contact with the contacted portions of the conduit convolutions; and (d) means on said fitting body for connecting said fitting body to the electrical junction box.

2. The assembly as recited in claim 1, wherein said first predetermined angle of said gripping means is between about five and fifteen degrees for matching the predetermined pitch angle of the conduit convolutions.

3. The assembly as recited in claim 1, wherein said first predetermined angle of said gripping means is about ten degrees for matching the predetermined pitch angle of the conduit convolutions.

4. The assembly as recited in claim 1, wherein said gripping end portion of said spring clip is substantially rectangular in shape and has a pair of opposite sides being disposed between five and fifteen degrees relative to said longitudinal axis of said fitting body, said grip end of said gripping end portion being disposed substantially perpendicular to said opposite sides so as to be provided at said first predetermined angle of said gripping means where said grip end makes the line contact with the contacted portions of the conduit convolutions.

5. The assembly as recited in claim 1, wherein said gripping end portion of said spring clip is substantially rectangular in shape and has a pair of opposite sides being disposed ten degrees relative to said longitudinal axis of said fitting body, said grip end of said gripping end portion being disposed substantially perpendicular to said opposite sides so as to be provided at said first predetermined angle of said gripping means where said grip end makes the line contact with the contacted portions of the conduit convolutions.

6. A conduit connector assembly for attachment of a conduit carrying electrical wires to an electrical junction box and having convolutions on an exterior surface extending at a predetermined pitch angle relative to a reference plane disposed perpendicular to a longitudinal axis of the conduit, said conduit connector assembly comprising:

(a) a fitting body having a longitudinal axis, a pair of open first and second opposite ends and an interior bore extending between said first and second opposite ends for receiving therein from said first opposite end an end portion of a conduit carrying electrical wiring which emanates from the end portion of the conduit, said fitting body at said second opposite end being insertable through an opening in an electrical junction box:

(b) end stop means on said fitting body for allowing passage of the electrical wiring into the electrical junction box and preventing passage of the end portion of the conduit into the electrical junction box;

(c) means on said fitting body for gripping the end portion of the conduit so as to hold the conduit end portion within said interior bore of said fitting body, said gripping means being disposed at a first predetermined anile relative to a reference plane disposed perpendicular to said longitudinal axis of said fitting body, said first predetermined angle of said gripping means being substantially equal to the predetermined pitch angle of the conduit convolutions whereby line contact is provided between said gripping means and portions of the conduit convolutions contacted by said gripping means, said gripping means including a grip tab and a spring clip, said grip tab being disposed on said fitting body and extending inwardly therefrom and projecting into said interior bore of said fitting body toward said second opposite end of said fitting body, said spring clip being inserted at said first opposite end of said fitting body and having a gripping end portion disposed at a first end thereof within said interior bore of said fitting body, said grip tab having a grip end disposed at said first predetermined angle of said gripping means and making the line contact with the contacted portions of the conduit convolutions; and (d) means on said fitting body for connecting said fitting body to the electrical junction box.

7. The assembly as recited in claim 6, wherein said first predetermined angle of said gripping means is between about five and fifteen degrees for matching the predetermined pitch angle of the conduit convolutions.

8. The assembly as recited in claim 6, wherein said first predetermined angle of said gripping means is about ten degrees for matching the predetermined pitch angle of the conduit convolutions.

9. The assembly as recited in claim 6, wherein said grip tab is substantially rectangular in shape and has a pair of opposite sides being disposed between five and fifteen degrees relative to said longitudinal axis of said fitting body, said grip end of said grip tab being disposed substantially perpendicular to said opposite sides so as to be provided at said first predetermined angle of said gripping means where said grip end makes the line contact with the contacted portions of the conduit convolutions.

10. The assembly as recited in claim 6, wherein said grip tab is substantially rectangular in shape and has a pair of opposite sides being disposed ten degrees relative to said longitudinal axis of said fitting body, said grip end of said grip tab being disposed substantially perpendicular to said opposite sides so as to be provided at said first predetermined angle of said gripping means where said grip end makes the line contact with the contacted portions of the conduit convolutions.

11. A conduit connector assembly for attachment of a conduit carrying electrical wires to an electrical junction box and having convolutions on an exterior surface extending at a predetermined pitch angle relative to a reference plane disposed perpendicular to a longitudinal axis of the conduit, said conduit connector assembly comprising:

(a) a fitting body having a longitudinal axis, a pair of open first and second opposite ends and an interior bore extending between said first and second opposite ends for receiving therein from said first opposite end an end portion of a conduit carrying electrical wiring which emanates from the end portion of the conduit, said fitting body at said second opposite end being insertable through an opening in an electrical junction box:

(b) end stop means on said fitting body for allowing passage of the electrical wiring into the electrical junction box and preventing passage of the end portion of the conduit into the electrical junction box:

(c) means on said fitting body for gripping the end portion of the conduit so as to hold the conduit end portion within said interior bore of said fitting body, said gripping means being disposed at a first predetermined angle relative to a reference plane disposed perpendicular to said longitudinal axis of said fitting body, said first predetermined angle of said gripping means being substantially equal to the predetermined pitch angle of the conduit convolutions whereby line contact is provided between said gripping means and portions of the conduit convolutions contacted by said gripping means, said gripping means including a grip tab and a spring clip, said grip tab being disposed on said fitting body and extending inwardly therefrom and projecting into said interior bore of said fitting body toward said second opposite end of said fitting body, said spring clip being inserted at said first opposite end of said fitting body and having a gripping end portion disposed at a first end thereof within said interior bore of said fitting body, said gripping end portion of said spring clip having a grip end disposed at said first predetermined angle of said gripping means and making the line contact with the contacted portions of the conduit convolutions; and (d) means on said fitting body for connecting said fitting body to the electrical junction box.

12. The assembly as recited in claim 11, wherein said first predetermined angle of said gripping means is between about five and fifteen degrees for matching the predetermined pitch angle of the conduit convolutions.

13. The assembly as recited in claim 11, wherein said first predetermined angle of said gripping means is about ten degrees for matching the predetermined pitch angle of the conduit convolutions.

14. The assembly as recited in claim 11, wherein said gripping end portion of said spring clip is substantially rectangular in shape and has a pair of opposite sides being disposed between five and fifteen degrees relative to said longitudinal axis of said fitting body, said grip end of said gripping end portion being disposed substantially perpendicular to said opposite sides so as to be provided at said first predetermined angle of said gripping means where said grip end makes the line contact with the contacted portions of the conduit convolutions.

15. The assembly as recited in claim 11, wherein said gripping end portion of said spring clip is substantially rectangular in shape and has a pair of opposite sides being disposed ten degrees relative to said longitudinal axis of said fitting body, said grip end of said gripping end portion being disposed substantially perpendicular to said opposite sides so as to be provided at said first predetermined angle of said gripping means where said grip end makes the line contact with the contacted portions of the conduit convolutions.

* * * * *